`US010048133B2`

(12) United States Patent
Smith et al.

(10) Patent No.: US 10,048,133 B2
(45) Date of Patent: Aug. 14, 2018

(54) THERMAL INSPECTION SYSTEM

(71) Applicant: United Technologies Corporation, Hartford, CT (US)

(72) Inventors: Kevin D. Smith, Glastonbury, CT (US); David A. Raulerson, Palm Beach Garden, FL (US); Zhong Ouyang, Glastonbury, CT (US); Lisa J. Brasche, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 508 days.

(21) Appl. No.: 14/640,750

(22) Filed: Mar. 6, 2015

(65) Prior Publication Data

US 2016/0177772 A1 Jun. 23, 2016

Related U.S. Application Data

(60) Provisional application No. 61/949,762, filed on Mar. 7, 2014.

(51) Int. Cl.
| | | |
|---|---|---|
| *F01D 17/08* | (2006.01) | |
| *G01J 5/00* | (2006.01) | |
| *G01J 5/08* | (2006.01) | |
| *G01J 5/06* | (2006.01) | |
| *F01D 5/18* | (2006.01) | |

(52) U.S. Cl.
CPC ............ *G01J 5/0037* (2013.01); *F01D 5/187* (2013.01); *G01J 5/0088* (2013.01); *G01J 5/061* (2013.01); *G01J 5/0859* (2013.01); *F05D 2260/83* (2013.01); *Y02T 50/676* (2013.01)

(58) Field of Classification Search
CPC ...... F01D 17/085; F01D 25/12; G01J 5/0037; G01J 5/0088; G01J 5/061; G01J 5/0869; G01J 5/0859
USPC .................................................. 416/61, 97 R
See application file for complete search history.

(56) References Cited

U.S. PATENT DOCUMENTS

| | | | | |
|---|---|---|---|---|
| 3,566,669 | A * | 3/1971 | Lawrence | G01B 11/00 250/330 |
| 4,644,162 | A * | 2/1987 | Bantel | G01N 25/72 250/334 |
| 4,992,025 | A * | 2/1991 | Stroud | B23K 26/388 415/115 |
| 6,153,889 | A | 11/2000 | Jones | |
| 6,524,395 | B1 | 2/2003 | Devine, II | |
| 7,095,495 | B2 | 8/2006 | Bowles et al. | |
| 7,579,830 | B2 | 8/2009 | Roney et al. | |
| 7,651,261 | B2 | 1/2010 | Bunker et al. | |
| 7,671,338 | B2 * | 3/2010 | Key | G01J 5/0088 250/339.03 |
| 7,890,274 | B2 | 2/2011 | Bunker et al. | |
| 7,909,507 | B2 | 3/2011 | Bunker et al. | |

(Continued)

*Primary Examiner* — Woody Lee, Jr.
*Assistant Examiner* — Maxime Adjagbe
(74) *Attorney, Agent, or Firm* — O'Shea Getz P.C.

(57) ABSTRACT

A thermal inspection system is provided for a gas turbine engine hot section component with a cooling passage. This thermal inspection system includes a fluid subsystem operable to supply a fluid into the cooling passage. The thermal inspection system also includes a thermal camera subsystem operable to monitor a fluid temperature difference of the fluid exiting the cooling passage relative to the input temperature of the fluid supplied to the cooling passage.

14 Claims, 5 Drawing Sheets

(56) References Cited

U.S. PATENT DOCUMENTS

| | | |
|---|---|---|
| 8,206,108 B2 | 6/2012 | Riahi et al. |
| 8,287,183 B2 | 10/2012 | Shepard et al. |
| 8,292,581 B2 | 10/2012 | Poon et al. |
| 8,768,646 B2 * | 7/2014 | Key .......................... G01J 5/00 374/29 |
| 2004/0149905 A1 | 8/2004 | Bowles et al. |

\* cited by examiner

THERMAL INSPECTION SYSTEM

CROSS-REFERENCE TO RELATED APPLICATION

This application claims priority to U.S. Provisional Patent Application Ser. No. 61/949,762 filed Mar. 7, 2014, which is hereby incorporated herein by reference in its entirety.

BACKGROUND

The present disclosure relates to a thermal inspection system.

Gas turbine engines, such as those which power modern military and commercial aircraft, include a compressor section to pressurize a supply of air, a combustor section to burn a hydrocarbon fuel in the presence of the pressurized air, and a turbine section to extract energy from the resultant combustion gases and generate thrust.

Gas turbine engine hot section components such as blades, vanes, augmentor sections, exhaust ducts, combustor liners and nozzle section are subject to high thermal loads for prolonged time periods. Historically, such components have implemented various air-cooling arrangements with numerous cooling passages that permit the passage of cooling air sourced from the compressor or fan section.

A complex cooling passage geometry may include a diffuser section as well as a metering section to facilitate effective cooling efficiencies. Current processes to measure such passages, however, are relatively time consuming.

SUMMARY

A thermal inspection system for a gas turbine engine hot section component with a cooling passage, according to one disclosed non-limiting embodiment of the present disclosure, includes a fluid subsystem operable to supply a fluid into the cooling passage. The thermal inspection system also includes a thermal camera subsystem operable to monitor a fluid temperature difference of the fluid exiting the cooling passage relative to ambient.

In a further embodiment of the present disclosure, the thermal camera subsystem is operable to measure temperature differences on the order of one-one hundredth of a degree C.

In a further embodiment of the present disclosure, passage of the fluid through the cooling passage results in a temperature difference on the order of tenths of a degree C.

In a further embodiment of the present disclosure, the cooling passage is a shaped passage.

In a further embodiment of the present disclosure, the component is a turbine blade.

In a further embodiment of the present disclosure, a control subsystem is included and operable to compare the fluid temperature difference of the fluid exiting the cooling passage to a baseline.

In a further embodiment of the present disclosure, an acceptable maximum/minimum dimension of the cooling passage defines the baseline.

A method of inspecting a gas turbine engine hot section component with a cooling passage, according to another disclosed non-limiting embodiment of the present disclosure, includes supplying a fluid into the cooling passage; and monitoring a fluid temperature difference of the fluid exiting the cooling passage.

In a further embodiment of the present disclosure, the method includes comparing the fluid temperature difference of the fluid exiting the cooling passage to a baseline.

In a further embodiment of the present disclosure, the method includes defining the baseline with respect to acceptable dimensions of the cooling passage.

In a further embodiment of the present disclosure, the method includes defining the baseline with respect to an acceptable maximum/minimum dimension of the cooling passage.

In a further embodiment of the present disclosure, the supplying of the fluid into the cooling passage includes supplying the fluid to at least one internal passageway of the component for exit through a multiple of the cooling passages.

A method of inspecting a gas turbine engine hot section component with a cooling passage, according to another disclosed non-limiting embodiment of the present disclosure, includes supplying a fluid into at least one internal passageway of the component for exit through a multiple of the cooling passages; monitoring a fluid temperature difference of the fluid exiting each of the multiple of cooling passages; and comparing the fluid temperature difference of the fluid exiting each of the cooling passages to a baseline defined by an acceptable maximum/minimum dimension of the cooling passage.

In a further embodiment of the present disclosure, the fluid temperature difference of the fluid exiting each of the multiple of cooling passages is on the order of tenths of a degree C.

In a further embodiment of the present disclosure, the monitoring of the fluid temperature difference is measured to one-one hundredth of a degree C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment(s). The drawings that accompany the detailed description can be briefly described as follows.

DETAILED DESCRIPTION

Figure 1:
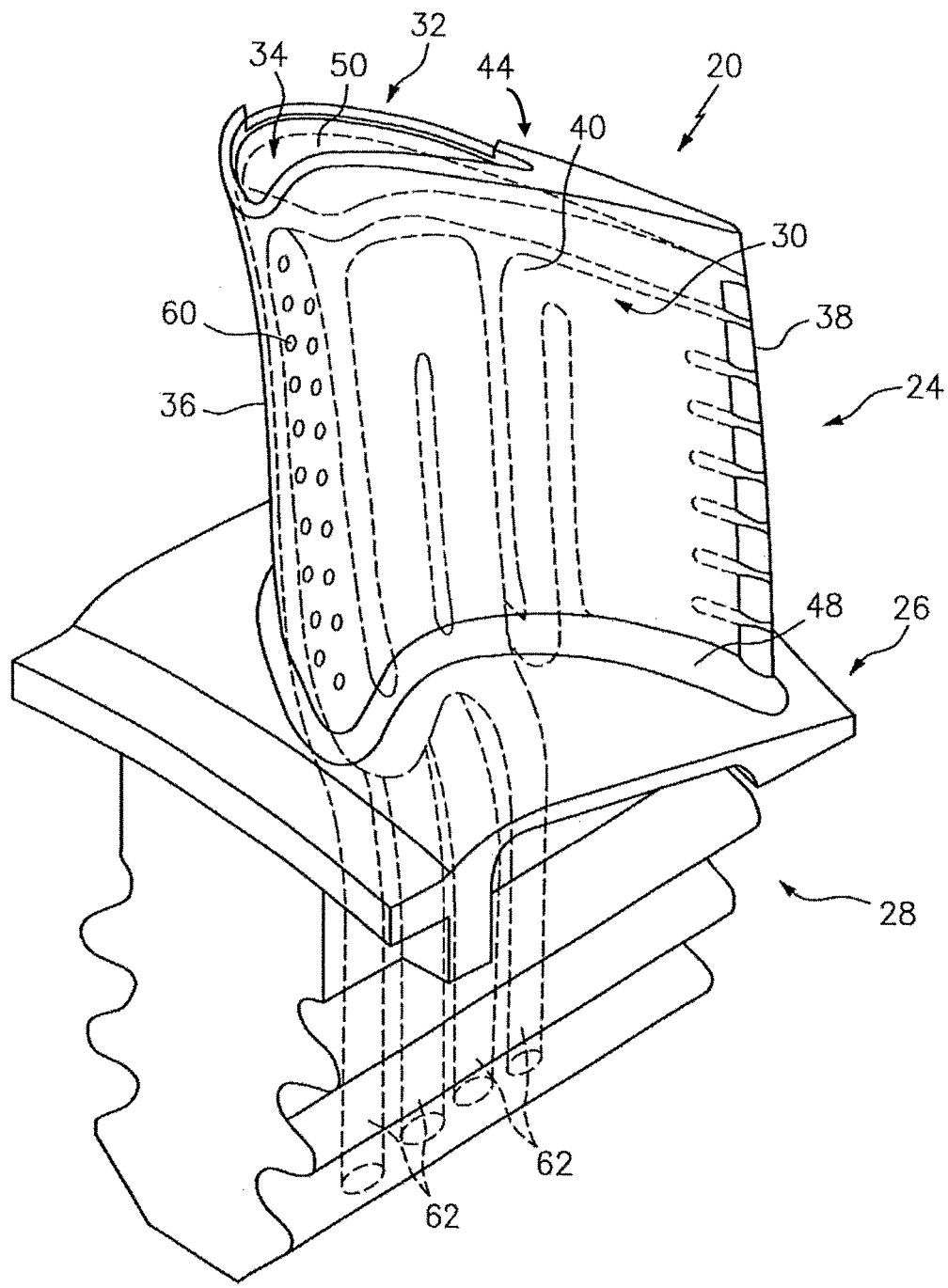
FIG. 1 is a general schematic view of an exemplary workpiece for use with the present disclosure.

FIG. 1 schematically illustrates a turbine blade 20. It should be appreciated that although the example turbine blade 20 is illustrated as the workpiece in the disclosed non-limiting embodiment, other components, such as vanes, exhaust duct liners, nozzle flaps nozzle seals as well as other actively cooled components will also benefit herefrom. These components operate in challenging high-temperature environments such as a hot section of a gas turbine engine and have aggressive requirements in terms of durability and temperature allowances.

The blade 20 generally includes an airfoil section 24, a platform section 26, and a root section 28. The platform section 26 is configured to radially contain turbine airflow. The root section 28 attaches the turbine blade 20 to a turbine rotor disk (not illustrated) and may be machined into any one of numerous shapes.

The airfoil section 24 generally includes a concave, pressure side wall 30, a convex, suction side wall 32 opposite the concave, pressure side wall 30, and a tip wall 34 that extends between the pressure sidewall 30 and the suction side wall 32. The walls have outer surfaces that together define an airfoil shape. The airfoil shape is defined by a leading edge 36, a trailing edge 38, a pressure side 40 of the pressure side wall 30, a suction side 44 of the suction side wall 32, an airfoil platform fillet 48, and a tip recess 50.

The blade 20 includes a multiple of cooling passages 60 in the airfoil section 24 that communicate with internal passageways 62 (shown schematically in phantom) that extend through the root section 28. The cooling passages 60 may be formed with lasers, Electron Discharge Machining (EDM), water jet or other techniques and are typically approximately 0.020-0.125 inches (0.5-3.2 mm) in diameter and may be drilled normal or angled to the surface. The cooling passages 60 provide cooling air from the internal passageways 62 to the exposed surface to reduce temperatures and heat transfer.

Flow path surfaces such as the airfoil section 24 and the associated surfaces of the platform section 26 are coated to provide thermal barrier, environmental barriers and/or other capabilities required to survive in the high-temperature environment or to meet requirements. The coating may be a thermal barrier coating that includes a bond coat and a top coat. The bond coat in one disclosed non-limiting embodiment may be a nickel-based alloy material and the top coat may be a ceramic material, each typically applied in layers via, for example, a plasma spray coating system. The top coat is typically thicker than the bond coat.

Figure 2:
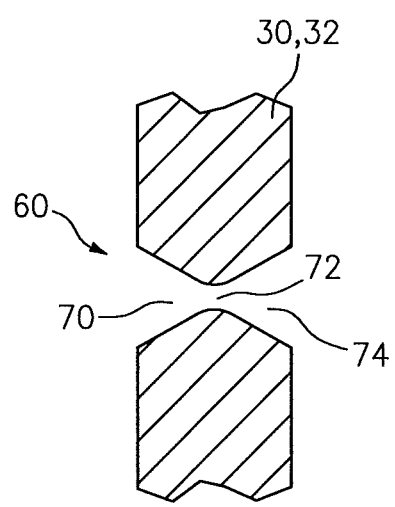
FIG. 2 is a schematic sectional view of a passage though the workpiece according to one disclosed non-limiting embodiment.

With reference to FIG. 2, the cooling passages 60 in this disclosed non-limiting embodiment are shaped cooling passage which is often alternatively referred to as a "diffusion", "fanned" or "laid back" cooling passage. Each passage 60 generally defines a convergent section 70, a diffusion section 74 and a metering section 72 therebetween. That is, the passage 60 is a "shaped" passage that provides a choked flow. Although shaped-passages are illustrated in the disclosed non-limiting embodiment, various passages that are laser drilled or otherwise machined will also benefit herefrom.

Figure 3:
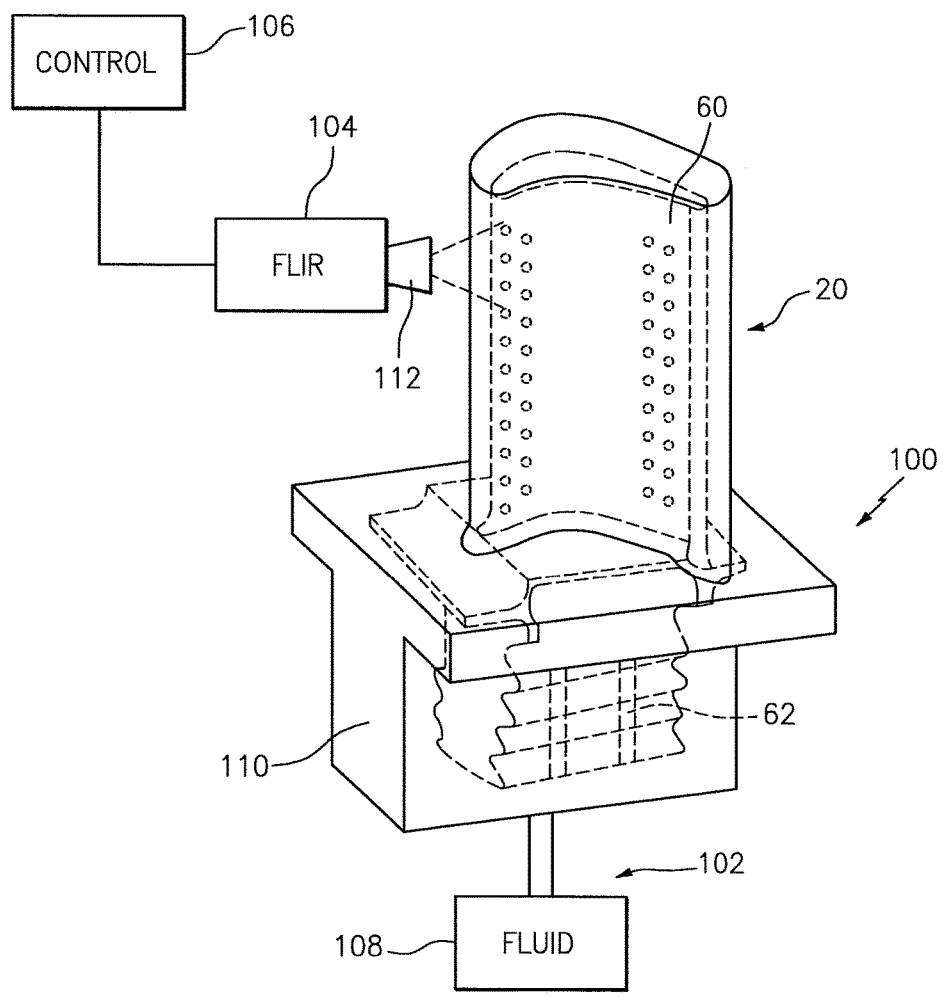
FIG. 3 is a schematic view of a thermal inspection system to measure passages in a workpiece according to one disclosed non-limiting embodiment.

With reference to FIG. 3, a thermal inspection system 100 integrates measurement of the distribution of the cooling air from the cooling passages 60 with measurement of the metering holes cooling passages 60. The system 100 generally includes a fluid subsystem 102, a thermal camera subsystem 104 and a control subsystem 106. It should be appreciated that although particular subsystems are described in detail, alternative or additional subsystems will also benefit herefrom.

The fluid subsystem 102 generally includes a supply 108 and a mount 110 for the workpiece such that a fluid such as air is supplied into the internal passageways 62 for exit through the cooling passages 60. The air may be controlled for humidity and temperature.

The thermal camera subsystem 104 includes a high frame rate, thermal camera 112 such as a staring focal plane array which measures temperature differences on the order of one-one hundredth of a degree C. One non-limiting example of the high frame rate thermal camera is a SC6700 infrared imaging camera, commercially available from FUR Systems®, with offices in Portland, Oreg. USA, and Stockholm, Sweden. The high sensitivity, high frame rate camera is operable to resolve small temperature differences through a thin thermal layer.

Figure 4:
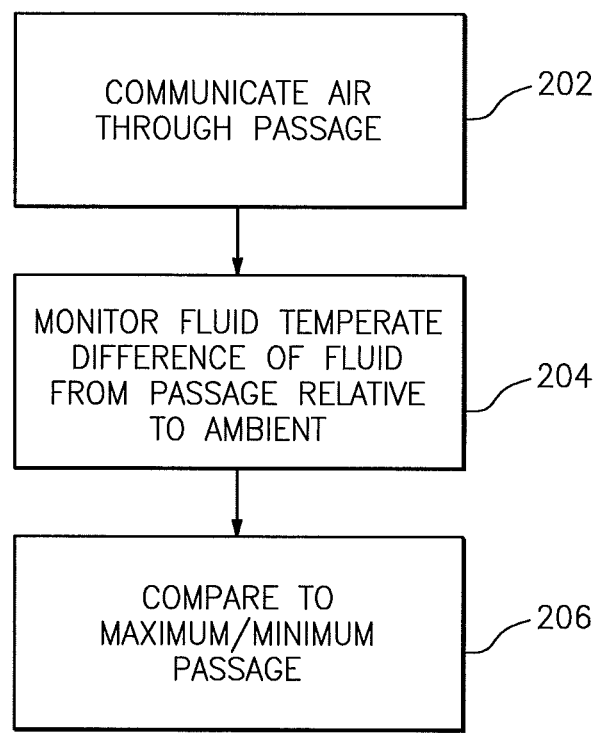
FIG. 4 is a flowchart that depicts operation of the thermal inspection system according to one disclosed non-limiting embodiment.
Figure 5:
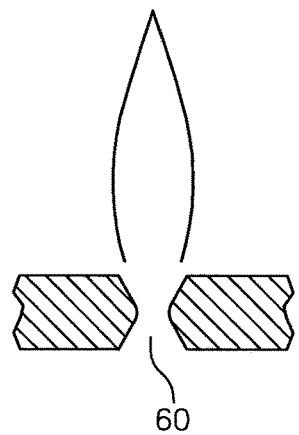
FIG. 5 is a schematic view of a thermal inspection system measurement of a nominal passage in the workpiece.

The control subsystem 106 may be utilized for data acquisition, system control and data processing. The functions 200 (see FIG. 4) of the control subsystem 106 are disclosed in terms of functional block diagrams, and it should be understood by those skilled in the art with the benefit of this disclosure that these functions may be enacted in either dedicated hardware circuitry or computer readable medium containing programming instructions capable of execution in a microprocessor based computing device. For example, when the control subsystem 106 is in operation, a processor can be configured to execute software stored within a memory, to communicate data to and from the memory, and to generally control operations pursuant to the software. Software in memory, in whole or in part, is read by the processor, perhaps buffered within the processor, and then executed through an input-output interface.

In operation, the fluid subsystem 102 communicates fluid into the mount 110, then the internal passageways 62, and out through the cooling passages 60 (step 202). As the fluid is flowed through the cooling passages 60, thermal measurement utilizing the thermal camera subsystem 104 is performed to monitor the fluid temperature difference of the fluid exiting the cooling passages 60 relative to the input temperature of the fluid supplied to the cooling passage (step 204; see FIG. 4). That is, the thermal camera subsystem 104 are focused on the exit of each cooling passage 60 to view the airflow as it exits therefrom and provides a contrast with ambient.

The velocity change to the airflow as it transitions from the metering section 74 of the cooling passages 60 to the diffuser section 72 of the cooling passages 60 causes a change in the temperature of the air typically on the order of tenths of a degree C./F (1-2 degree F.) with respect to ambient. This is well within the sensitivity of the thermal camera 112 and provides a range to identify unacceptable geometry of the cooling passage 60.

Figure 6:
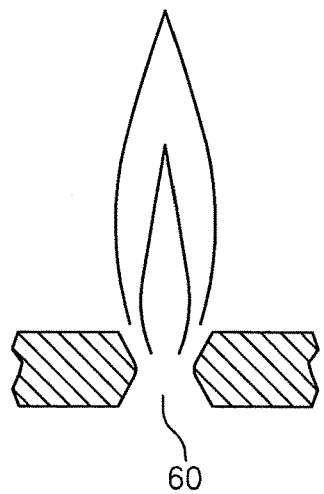
FIG. 6 is a schematic view of a thermal inspection system measurement of a maximum acceptable passage in the workpiece.
Figure 7:
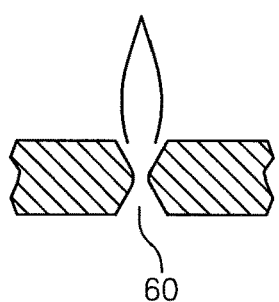
FIG. 7 is a schematic view of a thermal inspection system measurement of a minimum acceptable passage in the workpiece.

Due at least in part to the sensitivity of the measurement, the control subsystem 106 may be utilized to determine in an automated manner, not only a blocked cooling passages 60, but also whether the cooling passage 60 is performing in a sub-par manner and the cooling passage 60 needs to be resized. The fluid temperatures difference caused by the fluid exiting the cooling passage 60, may be compared to an acceptable baseline (step 206). The acceptable baseline may be determined by identification of a temperature difference of the airflow through a cooling passage 60 manufactured to acceptable maximum dimensions (see FIG. 6) and acceptable minimum dimensions (see FIG. 7). That is, the acceptable baseline dimensions provide a frame of reference range within which the airflow from the cooling passage 60 must fall for acceptance of the cooling passage 60. The comparison and acceptance may be automated via the control subsystem 106.

This system 100 integrates measurement of cooling air distribution with measurement of the passages to thereby eliminate the need for a separate measurement system as well as additional transportation and queue time.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A thermal inspection system for a gas turbine engine hot section component with a cooling passage, the system comprising:
   a fluid subsystem operable to supply a fluid into the cooling passage;
   a thermal camera subsystem operable to monitor a temperature of the fluid exiting the cooling passage; and
   a control subsystem operable to identify a difference of the temperature of the fluid exiting the cooling passage relative to an ambient temperature.

2. The system as recited in claim 1, wherein the thermal camera subsystem is operable to measure temperature differences on the order of one-one hundredth of a degree C.

3. The system as recited in claim 2, wherein passage of the fluid through the cooling passage results in a temperature difference on the order of tenths of a degree C.

4. The system as recited in claim 3, wherein the cooling passage is a shaped passage.

5. The system as recited in claim 4, wherein the component is a turbine blade.

6. The system as recited in claim 1, wherein an acceptable maximum/minimum dimension of the cooling passage defines a baseline.

7. The system as recited in claim 1, wherein the fluid subsystem is operable to supply the fluid into the cooling passage at an ambient temperature.

8. A method of inspecting a gas turbine engine hot section component with a cooling passage, comprising:
   supplying a fluid into the cooling passage;
   monitoring a temperature of the fluid exiting the cooling passage; and
   identifying a difference in the temperature of the fluid exiting the cooling passage relative to an ambient fluid temperature.

9. The method as recited in claim 8, further comprising defining a baseline with respect to acceptable dimensions of the cooling passage.

10. The method as recited in claim 8, further comprising defining a baseline with respect to an acceptable maximum/minimum dimension of the cooling passage.

11. The method as recited in claim 8, wherein the supplying of the fluid into the cooling passage comprises supplying the fluid to at least one internal passageway of the component for exit through a multiple of the cooling passages.

12. A method of inspecting a gas turbine engine hot section component, comprising:
   supplying a fluid into at least one internal passageway of the component for exit through a multiple of the cooling passages;
   monitoring a temperature of the fluid exiting each of the multiple of cooling passages; and
   identifying a difference in the temperature of the fluid exiting each of the cooling passages relative to an ambient temperature, and
   wherein the supplied fluid is at an ambient temperature.

13. The method as recited in claim 12, wherein a fluid temperature difference of the temperature of the fluid exiting each of the multiple of cooling passages relative to the ambient temperature is on the order of tenths of a degree C.

14. The method as recited in claim 13, wherein the fluid temperature difference is measured to one-one hundredth of a degree C.

* * * * *